United States Patent [19]

Beckett

[11] Patent Number: 5,445,843
[45] Date of Patent: Aug. 29, 1995

[54] CHOCOLATE SHAPE RETENTION

[75] Inventor: Stephen T. Beckett, York, England

[73] Assignee: Nestec S.A., Vevey, Switzerland

[21] Appl. No.: 272,136

[22] Filed: Jul. 8, 1994

[30] Foreign Application Priority Data

Aug. 4, 1993 [GB] United Kingdom ............... 9316145

[51] Int. Cl.⁶ .............................................. A23G 1/00
[52] U.S. Cl. ...................................... 426/548; 426/98; 426/99; 426/660; 426/804
[58] Field of Search ................ 426/660, 548, 98, 99, 426/804

[56] References Cited

U.S. PATENT DOCUMENTS

| | | | |
|---|---|---|---|
| 4,105,801 | 8/1978 | Doghotti | 426/548 |
| 4,134,999 | 1/1979 | Muhler | 426/653 |
| 4,980,189 | 12/1990 | Keme | 426/659 |
| 4,980,192 | 12/1990 | Finkel | 426/631 |
| 5,017,400 | 5/1991 | Olinger | 426/658 |
| 5,063,081 | 11/1991 | Kruger | 426/658 |
| 5,108,769 | 4/1992 | Kines | 426/602 |
| 5,126,151 | 6/1992 | Bodor | 426/99 |
| 5,204,029 | 4/1993 | Morgan | 426/99 |
| 5,223,303 | 6/1993 | Taskinen | 426/548 |
| 5,244,690 | 9/1993 | Schueren | 426/519 |

FOREIGN PATENT DOCUMENTS

| | | |
|---|---|---|
| 0455386A1 | 11/1991 | European Pat. Off. . |
| 0459777A1 | 12/1991 | European Pat. Off. . |
| WO8600787 | 2/1986 | WIPO . |

*Primary Examiner*—Carolyn Paden
*Attorney, Agent, or Firm*—Vogt & O'Donnell

[57] ABSTRACT

A process for improving the shape retention of chocolate or chocolate type products so that they have a reduced tendency to deform at elevated temperatures which comprises mixing an encapsulated product in particulate form comprising capsules of a polyol enclosed within an edible lipid with a flowable mixture of chocolate type ingredients, the encapsulated product being added in an amount to achieve a polyol content of from 0.2 to 5% by weight based on the total amount of the resultant chocolate.

10 Claims, No Drawings

CHOCOLATE SHAPE RETENTION

BACKGROUND OF THE INVENTION

The present invention relates to a process for improving the shape retention of chocolate or chocolate type products so that they have a reduced tendency to deform or melt at elevated temperatures or to stick to the packaging material.

Chocolate products are usually thorough mixtures of liquid cocoa, cocoa butter, sugar, lecithin and possibly milk and flavouring substances. They therefore contain fatty substances which soften and melt between 30° and 35° C.

When articles which consist entirely or partly of these products are exposed to temperatures lying above the melting point of the aforesaid fatty substances, (i.e. temperatures occurring during the summer season or in tropical countries), they tend to lose their original shape and appearance, and become soft and unpleasant to handle. If they are wrapped, the surface of the article may adhere to the wrapper and may produce unsightly fat staining.

In the case of chocolate type coatings intended to enrobe articles such as biscuits, confectionery, etc., the articles immediately lose their original appearance and are no longer suitable for consumption when they have been exposed to high temperature.

Different processes have been proposed in order to avoid the said disadvantages, but the products obtained, although more resistant to the effects of high temperature, have an unpleasant taste and a perceptibly coarser texture than that of normal conched chocolate.

In EP-B-189469 there is claimed a method of increasing the viscosity of a chocolate composition containing cocoa butter so that said composition will be substantially non-flowable at a temperature well above the normal melting point of cocoa butter characterised in comprising mixing 0.2 to 5 wt % of a liquid polyol selected from the group comprising glycerine, sorbitol, propylene glycol, mannitol, corn syrup and combinations and solutions thereof to a chocolate mixture after it has been tempered. However, a disadvantage of this process is that the chocolate tends to set rapidly e.g. from 40 to 60 seconds and this allows very little time for the further processing of the chocolate e.g. moulding into tablets of the desired shape or depositing a coating. A disadvantage of this method is that special additional equipment would be needed to incorporate the polyol at the latest possible time before further processing of the chocolate to prevent premature setting of the chocolate.

EP-A-459777 describes and claims a structured fat emulsion for incorporation into a confectionery coating as the fat ingredient thereof, said structured fat emulsion comprising:

a blend of a polyol component together with a fat component, said blend being a polyol-in-fat emulsion in which between about 2 and about 20 weight percent, based on the total weight of polyol-in-fat emulsion, of said polyol components is emulsified within said fat component, whereby said structured fat emulsion effects a time delay in the development of enhanced heat resistance and retardation of bloom development in a confectionery coating formulation when the formulation is subjected to setting conditions to form a set confectionery coating, and whereby these properties are substantially latent until the confectionery coating formulation is subjected to the setting conditions at least to the extent that the confectionery coating is flowable until subjected to the setting conditions. In this patent the polyol is blended separately with the fat ingredient of a confectionery coating before being added to the remaining ingredients of the confectionery coating so that the confectionery coating remains flowable until subjected to setting conditions. The confectionery coating may be a chocolate coating whereby the fat ingredient with which the polyol is blended may be, for instance, cocoa butter or a partially hydrogenated soybean fat. However, a disadvantage of a process of producing a confectionery coating containing a structured fat emulsion claimed in EP-A-459777 is that it cannot be used in the normal chocolate manufacturing process because the polyol has to be blended separately with the fat ingredient of the chocolate before adding to the remaining ingredients.

SUMMARY OF THE INVENTION

We have now found, surprisingly, that if a polyol encapsulated within an edible lipid, e.g. a fat or oil, is added in particulate form to a flowable mixture of chocolate ingredients containing substantially the normal fat content for a conventional chocolate or chocolate coating, the resultant chocolate not only has improved shape retention but the setting rate is similar to normal chocolate, i.e. very much slower than when using the method of EP-B-189469. In addition, this product can be used in the normal chocolate manufacturing process unlike the structured fat emulsion described in EP-A-459777.

DESCRIPTION OF THE PREFERRED EMBODIMENT

Accordingly, the present invention provides a process for improving the shape retention of chocolate or chocolate type products so that they have a reduced tendency to deform at elevated temperatures which comprises mixing an encapsulated product in particulate form comprising capsules of a polyol enclosed within an edible lipid with a flowable mixture of chocolate type ingredients, the encapsulated product being added in an amount to achieve a polyol content of from 0.2 to 5% by weight based on the total amount of the resultant chocolate.

Preferably the amount of polyol in the resultant chocolate is from 0.5 to 3% and especially from 1 to 2% by weight based on the total weight of the chocolate.

The particulate encapsulated product may be added to the flowable chocolate or chocolate type ingredients at any suitable stage e.g., in the case of chocolate and certain chocolate type products, usually after conching, and before, during or after tempering. Surprisingly, it has been found that the particulate encapsulated product may temper untempered chocolate thus making a separate tempering step unnecessary. The particulate encapsulated product should remain substantially in solid particulate form during the mixing and during subsequent processing which may include tempering and afterwards moulding into tablets or bars of the desired shape, or depositing a coating. The particulate encapsulated product is preferably in powdered form.

The flowable mixture of chocolate or chocolate type ingredients may consist of the ingredients used for conventional plain milk or white chocolate, substitute or imitation chocolate or low calorie chocolate to be used for chocolate bars or for coatings.

Encapsulation is a process of entrapping solid particles, droplets of liquids or gases in a thin coating and, in this invention, the encapsulated particles may be micro- or macro-capsules having an average diameter of from several tenths of a millimicron to a few thousand microns e.g. from 0.1 to 1000 microns, preferably from 0.5 to 500, more preferably from 1 to 300, even more preferably from 10 to 200 and especially from 20 to 150 microns.

The amount of polyol in the encapsulated product may be from 22.5 to 95% by weight based on the total weight of the encapsulated product. However, the amount of polyol in the product is conveniently from 30% to 80% by weight, more preferably from 35 to 70% by weight and especially from 40 to 60% by weight based on the total weight of the encapsulated product.

The polyol should be food acceptable and may be a straight or branched chain hydrocarbon based compound containing at least two hydroxyl groups on the carbon skeleton. For example, the polyol may be a dihydric alcohol, a trihydric alcohol or glycol such as glycerol, sorbitol, propylene glycol or corn syrup or any combination thereof. The polyol is preferably a liquid.

The edible lipid of the encapsulated product is preferably a fat similar to the fat contained in the chocolate or chocolate type product with which the encapsulated product is mixed, e.g. cocoa butter or a cocoa butter equivalent, substitute or improver, or palm-kernel fat. Although the melting point of the edible lipid may be slightly lower than that of the chocolate or chocolate type product with which it is mixed, it is preferably at least as high, e.g. from substantially the same as or similar up to 10° C. higher than, preferably up to 5° C. higher than, and more preferably up to 1° or 2° C. higher than the melting point of the chocolate or chocolate type product.

The polyol may be encapsulated within the edible lipid by any conventional encapsulation process, optionally using emulsifier, such as spray drying, spray chilling, coacervation, extrusion, inclusion complexation and co-crystallisation. One advantageous process involves mixing a lipid in liquid form with the polyol to form an emulsion, optionally in the presence of an emulsifier and/or water from 60° to 90° C. and homogenising the emulsion under pressure e.g. from $2 \times 10^6$ to $1 \times 10^7$ Pa at a temperature from 60° to 90° C. followed by spray cooling, for instance, in a cold room. Advantageously, an anti-caking agent such as cocoa powder may be added e.g. from 1 to 20%, preferably from 3 to 15% by weight based on the weight of the polyol.

Any suitable gentle blending procedure may be used for mixing the encapsulated product in particulate form with the flowable mixture of chocolate or chocolate type ingredients e.g. stirring at a temperature from 24° to 35° C. for a period of from 1 to 60 minutes.

The following Examples further illustrate the present invention. Parts and percentages are given by weight unless otherwise stated.

EXAMPLE 1

100 parts of cocoa butter were melted at a temperature of 79.4° C. and 0.1 part of lecithin was added to the molten cocoa butter. 40 parts of glycerol were added to the mixture while maintaining the temperature at 79.4° C. and the emulsion was homogenised with a two-stage homogeniser at pressures of 69/69 Bar ($6.9 \times 10^6/6.9 \times 10^6$ Pa) and a temperature of from 71° C. to 76° C.

The homogenised solution was then spray cooled in a cold room to give capsules having an average diameter of 100 microns containing 40% glycerol by weight.

5 parts of the encapsulated glycerol as prepared above are mixed with 100 parts of a flowable mixture of conched chocolate ingredients at 30° C. for 15 minutes. The chocolate remains flowable for several minutes without setting. The flowable chocolate is tempered and then moulded into bars. The bars are heated to 50° C. and retain their shape.

COMPARATIVE EXAMPLE A

A similar procedure to that described in Example 1 was carried out except that the flowable mixture of conched chocolate ingredients was not mixed with the encapsulated glycerol. When the bars were heated to 50° C. they deformed.

COMPARATIVE EXAMPLE B

When chocolate bars prepared according to Example 1 and chocolate bars prepared by a similar method but not mixed with encapsulated glycerol were heated to 50° C. and placed onto a filter paper, the amount of fat released onto the filter paper by the bars of the present invention was significantly less.

COMPARATIVE EXAMPLE C

A sample of the flowable chocolate ingredients containing encapsulated glycerol as prepared according to Example 1 was mixed in a table top temperer and remained flowable after two hours mixing. In contrast, a similar sample of flowable chocolate containing the same amount of glycerol which was not encapsulated became hard within four minutes.

EXAMPLE 2

A similar procedure to that described in Example 1 was carried out except that the separate tempering stage after addition of the encapsulated glycerol was omitted. It was found that the encapsulated glycerol tempered the chocolate. The tempered chocolate was then moulded into bars which retained their sahpe when heated to 50° C.

I claim:

1. A process for improving the shape retention of chocolate or chocolate type products so that they have a reduced tendency to deform at elevated temperatures which comprises mixing an encapsulated product in particulate form comprising capsules of a polyol enclosed within an edible lipid with a flowable mixture of chocolate type ingredients, the encapsulated product being added in an amount to achieve a polyol content of from 0.2 to 5% by weight based on the total amount of the resultant chocolate.

2. A process according to claim 1 wherein the amount of polyol in the resultant chocolate is from 0.5 to 3% by weight based on the total weight of chocolate.

3. A process according to claim 1 wherein, in the case of chocolate or certain chocolate type products, the particulate encapsulated product is mixed with the flowable mixture of chocolate or chocolate type ingredients after conching and before, during or after tempering of the chocolate or chocolate type ingredients.

4. A process according to claim 3 wherein the encapsulated product is mixed with untempered chocolate to temper the chocolate thus making a separate tempering step unnecessary.

5. A process according to claim 1 wherein the particulate encapsulated product remains in substantially solid form during the mixing and during subsequent processing.

6. A process according to claim 1 wherein the particles of the particulate encapsulated product have an average diameter of from 0.1 to 1000 microns.

7. A process according to claim 1 wherein the polyol is glycerol, sorbitol, propylene glycol or corn syrup or any combination thereof.

8. A process according to claim 1 wherein the edible lipid is cocoa butter, or a cocoa butter equivalent, substitute or improver, or palm kernel fat.

9. A process according to claim 1 wherein the edible lipid has a melting point which is from substantially the same to 10° C. higher than the melting point of the chocolate or chocolate type product with which it is mixed.

10. A chocolate or chocolate type composition having incorporated therein an encapsulated product comprising capsules of a polyol enclosed within an edible lipid whereby the polyol content is from 0.2 to 5% by weight based on the total weight of the chocolate or chocolate type composition.

* * * * *